– – –

United States Patent [19]

Levine

[11] 4,019,704
[45] Apr. 26, 1977

[54] MOTOR MOUNTING STRUCTURE

[75] Inventor: Fred Levine, Bay Harbor Islands, Fla.

[73] Assignee: Acme Service Corporation, Miami, Fla.

[22] Filed: May 28, 1975

[21] Appl. No.: 581,688

[52] U.S. Cl. .................................. 248/16; 248/231
[51] Int. Cl.² ........................................ F16F 15/00
[58] Field of Search .................. 248/27, 67, 68, 70, 248/71, 72, 74 R, 74 B, 231, 14, 16, 12, 3, 25, 15

[56] References Cited

UNITED STATES PATENTS

| 2,098,061 | 11/1937 | Munoz et al. | 248/16 |
| 2,679,993 | 6/1954 | Christophersen | 248/27 |
| 2,706,023 | 4/1955 | Merritt | 248/231 X |
| 3,894,707 | 9/1975 | Heard | 248/231 |

Primary Examiner—Ramon S. Britts
Assistant Examiner—Terrell P. Lewis
Attorney, Agent, or Firm—Clarence A. O'Brien; Harvey B. Jacobson

[57] ABSTRACT

An adjustable length clamp-type band is provided and includes a plurality of L-shaped mounting brackets including first and second generally right angulated flanges. One flange of each mounting bracket underlies the inner peripheral portion of the band and is slidably mounted on the latter for adjustable positioning therealong. The other flange of each bracket extends generally radially outwardly from the band in a plane paralleling the plane in which the band is disposed and each other flange further includes a centrally disposed elongated opening formed therethrough extending longitudinally of the other flange. The flanges slidably mounted on the band include centrally disposed parallel slits formed therethrough and extending longitudinally thereof defining elongated central strip portions of the flanges therebetween having opposite end portions integral with the portions of the flanges disposed between the pairs of corresponding ends of the slits. Each strip portion includes a longitudinal central portion thereof laterally displaced outwardly of the plane of the corresponding flange portion and coacting with the latter to define a flattened sleeve opening through which the adjacent portions of the band are slidingly received. In this manner, each of the mounting brackets is slidingly secured to the band for adjustable positioning thereabout and the band may therefore be secured about a motor or other appliance component with the apertured radially outwardly projecting flanges of the brackets defining adjustably positionable mounting flanges for the motor or other appliance component.

2 Claims, 4 Drawing Figures

MOTOR MOUNTING STRUCTURE

BACKGROUND OF THE INVENTION

Various forms of adjustable mounting brackets for motors or other appliance components have been heretofore designed. However, many of these previously devised mounting brackets have not included a full range of adjustment and others have included structure which is relatively expensive to produce.

Examples of previously patented mounting brackets of a type similar to the instant invenion are disclosed in U.S. Pat. No. 2,472,752, 3,127,092, 3,266,766 and 3,847,330.

BRIEF DESCRIPTION OF THE INVENTION

The mounting structure of the instant invention has been primarily designed for use as a universal motor mount for electrical appliance motors. However, the mounting structure may also be used in other environments and for supporting various different articles.

The main object of this invention is to provide a universal-type mounting structure for electrical appliance motors.

Another object of this invention, in accordance with the immediately preceding object, is to provide a mounting structure having a considerable range of adjustment.

Another important object of this invention is to provide a mounting structure which may readily conform to the external configuration of variously shaped articles to be mounted therefrom.

A further object of this invention is to provide a mounting structure which will readily conform to different size components to be mounted thereby.

A final object of this invention to be specifically enumerated herein is to provide an apparatus, in accordance with the preceding objects and which will conform to conventional forms of manufacture, be of simple construction and easy to use, so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
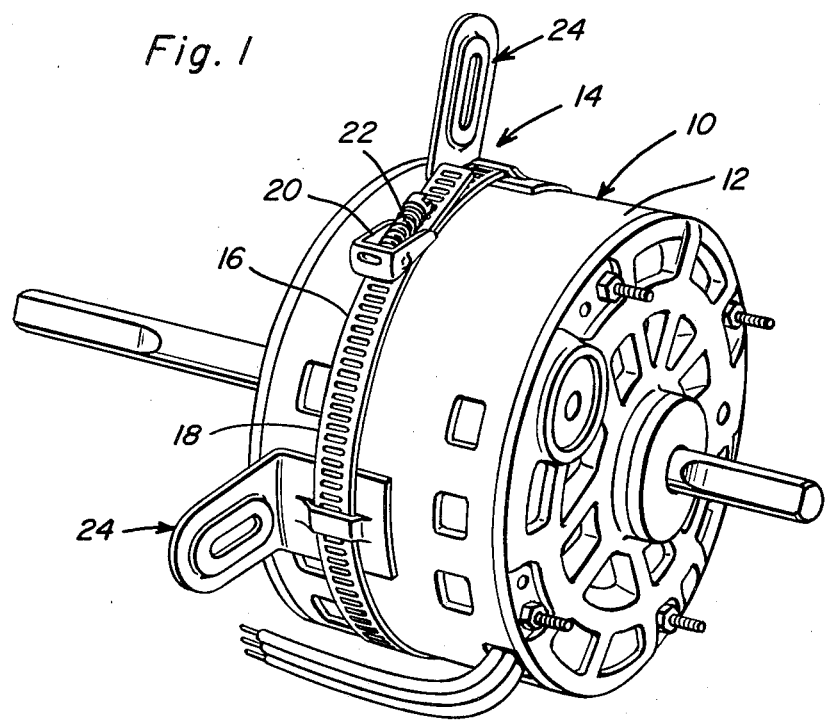
FIG. 1 is a perspective view of an electrical appliance motor with the adjustable motor mounting structure of the instant invention operatively associated therewith.
Figure 2:
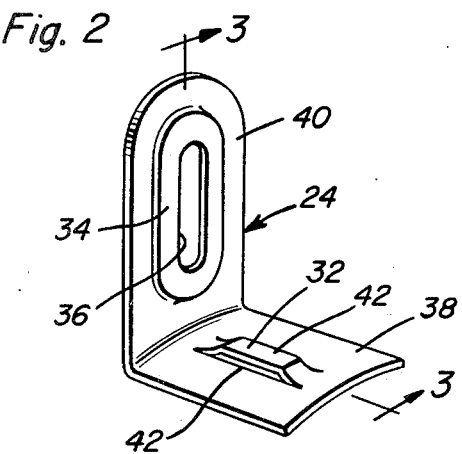
FIG. 2 is an enlarged perspective view of one of the L-shaped mounting brackets of the instant invention.

Referring now more specifically to the drawings, the numeral 10 generally designates an electric motor of an electrical appliance. The motor 10 includes a generally cylindrical case 12 and the motor mounting structure of the instant invention is referred to in general by the reference numeral 14 and illustrated in FIG. 1 of the drawings in operative association with the motor 10.

The structure 14 includes a stainless steel band-type claim 16 including a ban element 18, an adjusting screw supporting bracket 20 carried by one end of the band and an adjustment screw rotatably and pivotally supported from the support bracket 20. The adjustment screw 22 is swingable between active and inactive positions on opposite sides of an over center position and the screw 22 is threadedly engaged with the end of the band element 18 remote from the support bracket 20 when the screw 22 is in the active position thereof. Accordingly, the adjustment screw 22 may be turned in order to tighten the band element 18 about the case or casing 12. The band-type clamp 16 comprises conventional structure.

Figure 3:
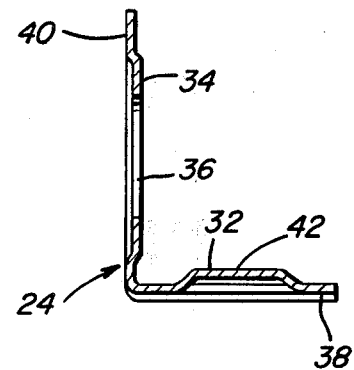
FIG. 3 is a vertical sectional view taken substantially upon the plane indicated by the section line 3—3 of FIG. 2.
Figure 4:
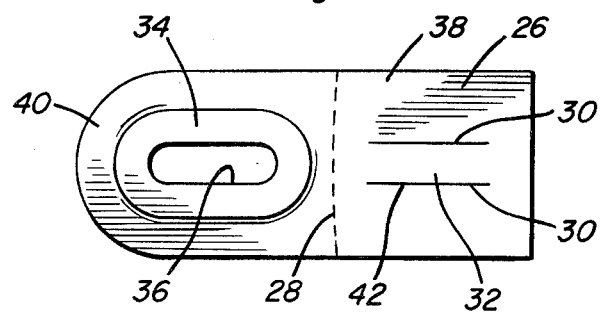
FIG. 4 is a plane view of a partially completed blank utilized in the construction of the L-shaped mounting brackets of the invention.

In addition to the clamp 16, the motor mounting structure 14 includes three mounting brackets referred to in general by the reference numerals 24. Each mounting bracket 24 is constructed from a blank 26 which is elongated in configuration and includes an arcuate central transverse bend zone or line 28. One end portion of the blank 26 is provided with a pair of parallel centrally disposed longitudinally extending slits 30 defining an elongated central strip portion 32 of the blank 26 therebetween. The other end portion of the blank 26 includes an oval-shaped laterally displaced portion 34 having an oval slot 36 formed centrally therethrough. The oval portion 34 and slot 36 extend longitudinally of the blank 26 and it will be noted from FIG. 3 of the drawings that the oval portion 34 is laterally displaced from a position coplanar with the remainder of the corresponding end of the blank 26 a distance equal to the thickness of the blank 26.

In completing the mounting brackets 24, each blank 26 is bent along the bend zone or line 28 so that the opposite ends of the blank 26 define substantially right angularly disposed flanges 38 and 40. In addition, the flange 38 is arched so as to be partial cylindrical in configuration for a purpose to be hereinafter more fully set forth. Inasmuch as the flange 38 is to be arched, the zone or line 28 is arcuate.

The strip portion 32 includes a central portion 42 spaced intermediate the opposite end portions thereof and the central portion 42 is laterally displaced relatively to the remainder of the flange 38 a distance approximately equal to twice the thickness of the flange 38. Accordingly, the central portion 42 and the adjacent portions of the flange 38 define a flattened sleeve opening extending transversely of the convex side of the flange 38, through which sleeve opening the band element 18 is slidably received.

From the foregoing, it may be fully appreciated that the mounting brackets 24 may be shifted longitudinally of the band element 18 as desired, and from FIG. 1 of the drawings, it may be seen that the band element passes over the convex side of the flange 38 beneath the central portion of the elongated strip portion 32 and therefore that there is no need to retain a plurality of non-slotted brackets in position about an associated motor by the use of a rubber band or the like until the equivalent of the band-type clamp 16 can be tightened. Also, from FIG. 1 of the drawings, it may seen that the mounting brackets 24 are arranged with the flanges 40 thereof extending generally radially outward from the band-type clamp 16 with the flanges 40 disposed in a plane substantially paralleling the plane containing the band element 18. Thus, motor mounting structure 14 may be tightened about the case or casing of the motor 10 with the L-shaped mounting brackets 24 in predetermined positions about the periphery of the casing 12. The partial cylindrical configuration of the flanges 38 enables the latter to more readily conform to the cylindrical outer surface portions of the casing 12 and the elongated opening 36 enables considerable range in the positioning of the fastening members (not shown) to be secured through the openings 36 in supporting the motor 10 by means of the motor mounting structure 14.

It will be readily appreciated that the laterally displaced portions 34 and 32 as well as the opening 36 may be formed in a single stamping operation and that the partially completed mounting brackets 24 may thereafter be bent along the zone or line 28 in order to complete the mounting brackets 24. Thus, the motor mounting structure 14 may be mass produced at a relatively low cost through the utilization of relatively inexpensively manufactured L-shaped mounting brackets and presently available band-type clamps.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A motor mounting bracket including a generally cylindrical adjustable circumference clamp-type band, at least two L-shaped brackets, each of said brackets including a pair of generally right angulated first and second elongated flanges integrally joined at one pair of adjacent ends, said first flange of each bracket having a mounting fastener opening formed therethrough and the second flange of each bracket including a central elongated longitudinally extending strip portion extending longitudinally thereof defined by and disposed between a pair of generally parallel longitudinal slits formed in said second flange, the opposite end portions of said strip portion being integral with the portions of said second flange disposed between the pairs of corresponding ends of said slits and said strip portion including a longitudinal central portion thereof extending between its opposite end portions laterally displaced outwardly of the side of said second flange defining one side of the included angle formed by said second flange and defining a flattened sleeve opening intermediate the opposite side edges of said second flange with said opening extending transversely of said second flange centrally intermediate the opposite end thereof and with one marginal portion of said sleeve opening coextensive with the surfaces of said second flange disposed outwardly of the remote sides of said slits and defining said one side of the included angle, said brackets being disposed on said band with the latter having longitudinally spaced portions thereof slidingly received through the sleeve openings of said brackets and with said second flanges of said brackets, exclusive of said strip portion abutted against the inner surface portions of the corresponding band portions and said first flanges projecting outwardly from the outer periphery of said band and disposed in substantially coplanar relation, the openings in each first flange comprising an elongate opening extending longitudinally of said first flange each of said first flanges including a central oval portion thereof laterally offset to one side of the central plane of said first flange, said opening in each first flange being centrally disposed relative to said oval offset portion.

2. The combination of claim 1 wherein said second flanges are transversely arcuate and substantially conform to the curvature of said band.

* * * * *